United States Patent [19]
Zhou et al.

[11] Patent Number: 5,767,965
[45] Date of Patent: Jun. 16, 1998

[54] APPARATUS AND METHOD FOR DRIVING DIFFRACTION GRATINGS

[75] Inventors: Andy Zhou, Bethlehem, Pa.; Thierry Aubry, Edison, N.J.; James Belsky, Edison, N.J.; Jagdish Rebello, Edison, N.J.; Steven Slutter, Lebanon, N.J.; Joseph Katzenberger, Lebanon, N.J.

[73] Assignee: Instruments S.A., Inc., Edison, N.J.

[21] Appl. No.: 656,077

[22] Filed: May 31, 1996

[51] Int. Cl.⁶ .................... G01J 3/06; G01J 3/18
[52] U.S. Cl. .................... 356/328; 356/334
[58] Field of Search .................... 356/328, 334

[56] References Cited

U.S. PATENT DOCUMENTS

| | | | |
|---|---|---|---|
| 3,306,158 | 2/1967 | Makabe et al. | 356/328 |
| 3,390,604 | 7/1968 | Makabe | 356/328 |
| 3,614,227 | 10/1971 | George | 356/334 |
| 4,140,399 | 2/1979 | Jänchen | 356/332 |
| 4,326,802 | 4/1982 | Smith, Jr. et al. | 356/316 |
| 4,329,051 | 5/1982 | Chamran et al. | 356/320 |
| 4,697,924 | 10/1987 | Akiyama | 356/333 |
| 4,775,234 | 10/1988 | Shimomura | 356/328 |
| 4,988,196 | 1/1991 | Gilligan | 356/308 |
| 5,107,367 | 4/1992 | Desnoux et al. | 359/225 |
| 5,280,338 | 1/1994 | Drozdowicz et al. | 356/328 |
| 5,283,624 | 2/1994 | Tsukada | 356/319 |

*Primary Examiner*—Vincent P. McGraw
*Attorney, Agent, or Firm*—Fish & Neave; Jeffrey H. Ingerman

[57] ABSTRACT

A grating drive apparatus for use in a multiple-grating spectrometer is provided. The spectrometer has an entrance slit, an exit port, an optical path between the entrance slit and the exit port, and a plurality of diffraction gratings. Each of the gratings is rotatable about a respective preferred axis for selecting a wavelength during spectrometer operation. The grating drive apparatus includes a turret having a plurality of gratings mounted on it, a mechanical stop assembly, and a drive assembly. The drive assembly causes the turret to engage the stop assembly to rotate the turret and select a grating. The drive assembly also rotates the selected grating to select an operational wavelength.

18 Claims, 4 Drawing Sheets

APPARATUS AND METHOD FOR DRIVING DIFFRACTION GRATINGS

BACKGROUND OF THE INVENTION

This invention relates to diffraction-grating spectrometers. More particularly, this invention relates to exchanging and operating diffraction gratings in a multiple grating spectrometer.

A spectrometer is an apparatus designed to measure the distribution of radiation of a light source in a particular wavelength region. Typically, an optical spectrometer collects light at its entrance slit and disperses it spectrally. A portion of the light is reimaged at the exit port of the spectrometer. Diffraction-grating spectrometers use one or more diffraction gratings to disperse and select a predetermined portion of the electromagnetic spectrum. Because a single diffraction grating can select from only a limited range of the entire available spectrum, the user may want to exchange a grating in the spectrometer with another grating in order to select a different region of the electromagnetic spectrum or to operate the spectrometer at a different resolution. And while using a single grating, the user may want rotate the grating about its axis to select a particular wavelength region from the range provided by that grating.

Various methods and apparatus for selecting any of the driving gratings in multiple-grating spectrometers are known, but have several disadvantages. For example, when inactive gratings are stored outside the spectrometer housing, grating exchange is usually complex, requiring that the spectrometer housing be opened or at least partially disassembled. Opening a spectrometer housing is undesirable because it disrupts the relatively clean condition of the optics in the housing, including the diffraction grating. Partial disassembly is even more undesirable because it is often awkward and time-consuming. Moreover, partial disassembly may disturb carefully oriented optical components located in the housing or, even worse, damage spectrometer components by accidental manipulation of them. Therefore, remote grating storage is often highly undesirable.

More desirably, multiple gratings may be stored in the spectrometer. Still, only one of the gratings is active in the spectrometer at any one time and the remaining gratings are inactive. All of the gratings are usually mounted on a pivotable carriage, or turret, that may be manually or motor driven. Manual driving of the turret is undesirable, at least because grating exchange is not possible in the absence of the operator. In addition, manual driving of the turret may involve the protrusion of a portion of the turret outside the housing, providing a route for the entry of dirt or other contamination, or stray light. Thus, motor-driven turrets are usually preferred.

Methods and apparatus for driving a grating turret with a motor are known. Some of these methods require two motors—one motor for changing gratings and another motor for rotating the grating about its axis to select an operational wavelength. Two-motor driving apparatus, however, tend to be bulky, complicated to design, and expensive to construct.

In another known method for driving gratings, at least two gratings are exchanged and operated on a rotatable turntable using a plurality of cams and cam followers. Such a device, however, is mechanically complicated, susceptible to miscalibration, and relatively expensive to manufacture because of its large number of machined components.

Therefore, it would be desirable to provide a grating drive apparatus for use in a multiple-grating optical spectrometer that both exchanges gratings and operates the spectrometer using a single motor.

It would also be desirable to provide a grating drive apparatus for use in a multiple-grating spectrometer that is compact, relatively inexpensive to manufacture, and relatively immune to miscalibration.

SUMMARY OF THE INVENTION

It is an object of this invention to provide a grating drive apparatus for use in a multiple-grating optical spectrometer that both exchanges gratings and operates the spectrometer using a single motor.

It is also an object of this invention to provide a grating drive apparatus for use in a multiple-grating spectrometer that is compact, relatively inexpensive to manufacture, and relatively immune to miscalibration.

In accordance with this invention, a grating drive apparatus for use in a multiple-grating spectrometer is provided. The spectrometer has an entrance slit, an exit port, an optical path between the entrance slit and the exit port, and a plurality of diffraction gratings. Each of the gratings is rotatable about a respective preferred axis for selecting a wavelength during spectrometer operation.

The grating drive apparatus includes a turret, a mechanical stop assembly, and a drive assembly. A plurality of diffraction gratings are mounted on the turret, which has a turret rotational axis, a plurality of grating mount positions which corresponds to the plurality of gratings, and a plurality of stop engaging surfaces, each of which correspond to one of the gratings. The stop engaging surfaces are aligned in a single rotational path. The turret is rotatable among a plurality of turret rotational positions. In each of the turret rotational positions, one grating is in the active position of the spectrometer in which the grating is in the optical path and rotatable about the preferred axis of that grating. The mechanical stop assembly is aligned in the single rotational path for engagement with any of the stop engaging surfaces of the turret.

The drive assembly drives the turret about the preferred axis of the grating which is in the active position. The drive assembly (a) selects the operational wavelength when the mechanical stop assembly is out of engagement with a stop engaging surface and (b) advances the turret from one of the turret rotational positions to another of the turret rotational positions when the mechanical stop assembly engages one of the stop engaging surfaces.

A method by which the system operates is also provided.

BRIEF DESCRIPTION OF THE DRAWINGS

The above and other objects and advantages of the invention will be apparent upon consideration of the following detailed description, taken in conjunction with accompanying drawings, in which like reference characters refer to like parts throughout, and in which.

DETAILED DESCRIPTION OF THE INVENTION

According to the present invention, a method and apparatus for driving gratings in a multiple-grating spectrometer are provided. By means of this invention, an operational wavelength may be selected and gratings may be exchanged.

This invention is suitable for use with a reflection-type diffraction grating, but may also be used with any light dispersing component that has a preferred rotational axis, such as a transmission-type diffraction grating or prism. The grating drive apparatus includes a drive assembly, a rotatable turret, and a mechanical stop assembly.

The drive assembly may be any convenient means for transferring the rotational motion from a motor to the rotational motion of pinion gear. Preferably, the drive assembly includes a support structure which includes a housing that is fixedly mounted to the spectrometer base plate. The support structure preferably supports a rotatable turntable via a main shaft. The turntable preferably includes a pinion gear. The turret is eccentrically mounted on the turntable.

The drive assembly also preferably includes one motor which has a rotatable motor shaft. The motor shaft is preferably coupled, directly or indirectly, to a worm gear for matingly engaging with the pinion gear, causing rotation of the turntable when the worm gear rotates.

Preferably, the turret is rotatable into any of a plurality of positions defined by any releasable locking mechanism, such as a detent mechanism. A plurality of diffraction gratings are mounted circumferentially around the turret. Preferably, the turret has a plurality of faces and one grating is mounted to each face of the turret. Preferably, each grating is mounted to the turret with an adjustable mounting device that preferably is adjusted so that the preferred rotational axis of each respective grating is precisely coaxial with the rotational axis of the turntable when the grating is active.

The turret has a plurality of stop engaging surfaces for engaging the mechanical stop assembly during grating exchange. Preferably, the surfaces are provided by grating position pins, which preferably extend substantially radially from the turret. When a grating position pin engages the mechanical stop assembly in a particular rotational direction, the turret rotates, effectuating grating replacement or exchange.

The mechanical stop assembly engages the stop engaging surfaces of the turret during turret rotation. Preferably, the mechanical stop assembly has an engagement device including a spring-loaded rotatable stop arm which has at least two faces and is supported by a shaft. One of the faces is preferably angled to facilitate the sliding motion of a pin when the turret rotates in one direction and the spring-loaded stop arm is pushed aside. The other face is preferably flat, to firmly engage a stop engaging surface during rotation of the turret in a second direction. Preferably, the stop assembly includes a grating stop pin for preventing the stop arm from rotating past the stop pin when the turret rotates in the second direction.

The grating drive apparatus preferably includes a plurality of position detectors for determining the rotational position of motor shaft and the turntable, and to determine which of the gratings is in the active position of the spectrometer. In combination, the position detectors can accurately determine the identity and position of which ever grating is in the active position. Preferably, this information can also be used to determined the selected wavelength. Furthermore, as is usual in spectrometer construction, a plurality of baffles may be employed for preventing stray light from contaminating the diffracted light.

In accordance with the present invention, a method is provided for exchanging grating in a spectrometer and for selecting an operational wavelength by rotating the turntable about the turntable axis. The stop arm is aligned in the rotational path of the turret, preferably in the rotational path of the stop engaging surfaces that are preferably provided by the grating position pins. To exchange a grating, the turntable is rotated so that one of grating position pins engages the flat side of the stop arm. In that case, the position pin applies a force to the stop arm. Because the stop arm is prevented from rotating about the stop arm rotational axis by the stop pin, the stop arm applies a counter-force to the engaging position pin. Responsive to that counter-force, the turret rotates and the grating in the active position is replaced by a new grating. The grating position pin or other stop engaging surface, and the stop arm, are preferably sized so that the grating position pin clears the stop arm just as the turret moves into the desired new position.

In order to rotate the turret about the turret axis, the force exerted by the stop arm against the engaging position pin during turntable rotation preferably overcomes the force holding the turret in place. Preferably, the holding force is provided by the detent mechanism. Once that force is overcome, the turret rotates during turntable rotation. Preferably, when the turret no longer engages the stop assembly, the detent mechanism releasably locks the turret in its next position.

Preferably, the force required to deflect the stop arm is less then the detent force, so that if the turret engages the angled face of the stop arm during turntable rotation, the turret remains fixed relative to the turntable and the grating in the active position is not exchanged. In that case, the turret does not rotate because the stop arm is rotatable and rotates out of the rotational path of the engaging surfaces of the turret.

To initiate a grating exchange, the turntable may be rotated in a first direction until an engaging surface, preferably provided by a position pin, slides past the angled face of the stop. Then, the turntable is preferably rotated in a second direction opposite the first direction so that the engaging surface engages the flat face of the stop. This rotation is continued until the turret advances. Alternatively, the turntable can simply be rotated in the second direction until the engaging surface engages the flat face of the stop arm and the turret advances.

Once a particular grating is selected, the turntable is rotated in the first direction to return the selected grating to the optical path. The turntable may then be rotated in either direction to rotate the selected grating about its preferred axis and select an operational wavelength.

A grating drive apparatus constructed in accordance with the present invention is shown in FIGS. 1–5. Grating drive apparatus 100 includes turret 200, mechanical stop assembly 300, and drive assembly 400, each of which are preferably mounted to spectrometer base plate 10.

Figure 2:
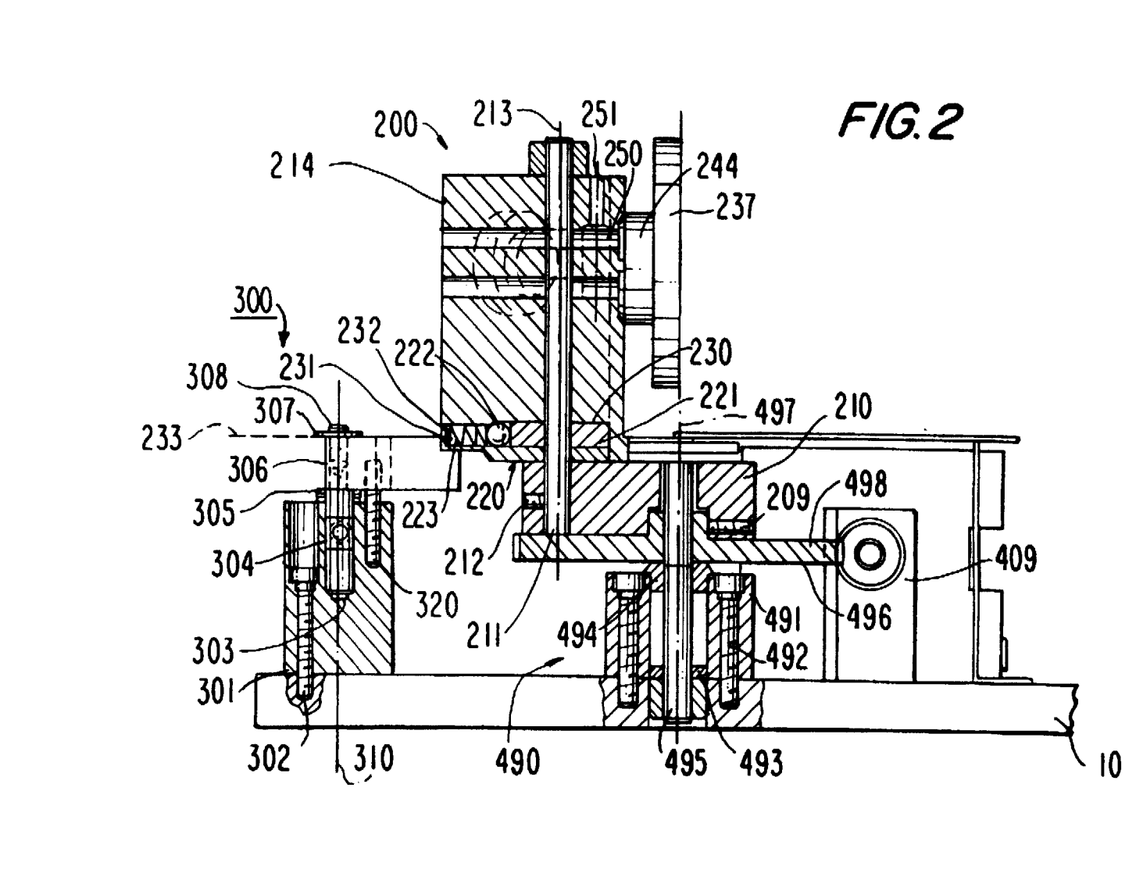
FIG. 2 is a side view of the grating drive apparatus shown in FIG. 1.

Turret 200, best seen in FIG. 2, includes a grating mount arm 210 that is mounted to upper face 498 of pinion gear 496 by any conventional means, preferably by set screw 209. Grating mount shaft 211 is preferably mounted to grating mount arm 210 by any conventional fastening means, preferably by set screw 212. Longitudinal axis 213 of grating mount shaft 211 is parallel to rotational axis 497 of pinion gear 496. Multi-position mount block 214 is preferably rotatably mounted about grating mount shaft 211 above upper face 498 of grating mount arm 210. Preferably, mount block 214 is rotatable into any of a plurality of positions provided by detent mechanism 220, although it should be clear that any releasable locking mechanism may be used.

Figure 3:
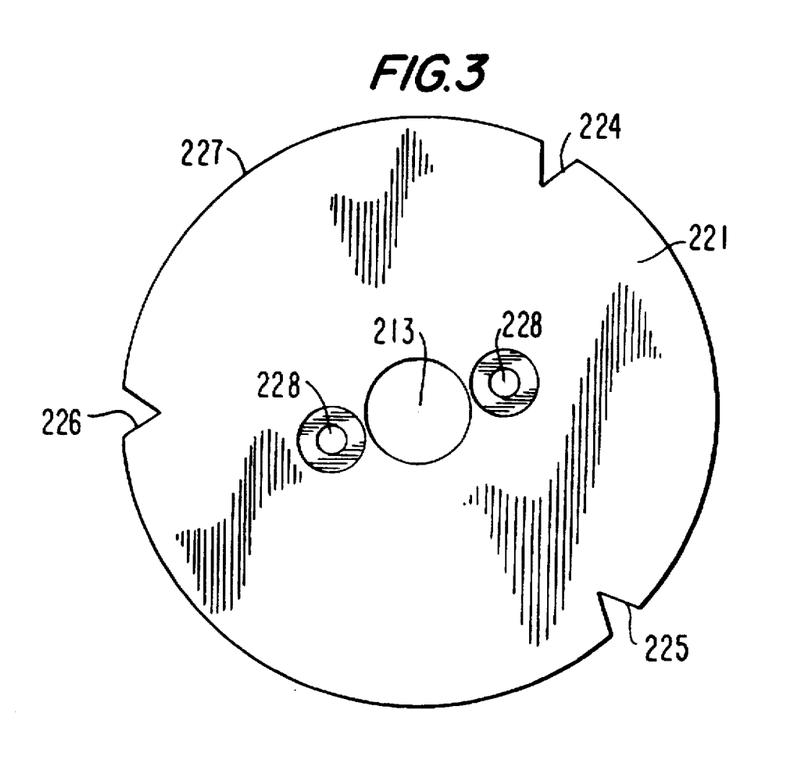
FIG. 3 is a top view of the collar shown in FIG. 2.
Figure 4:
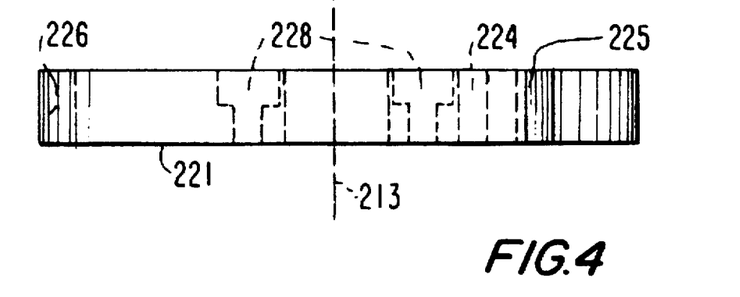
FIG. 4 is a side view of the collar shown in FIG. 2.
Figure 5:
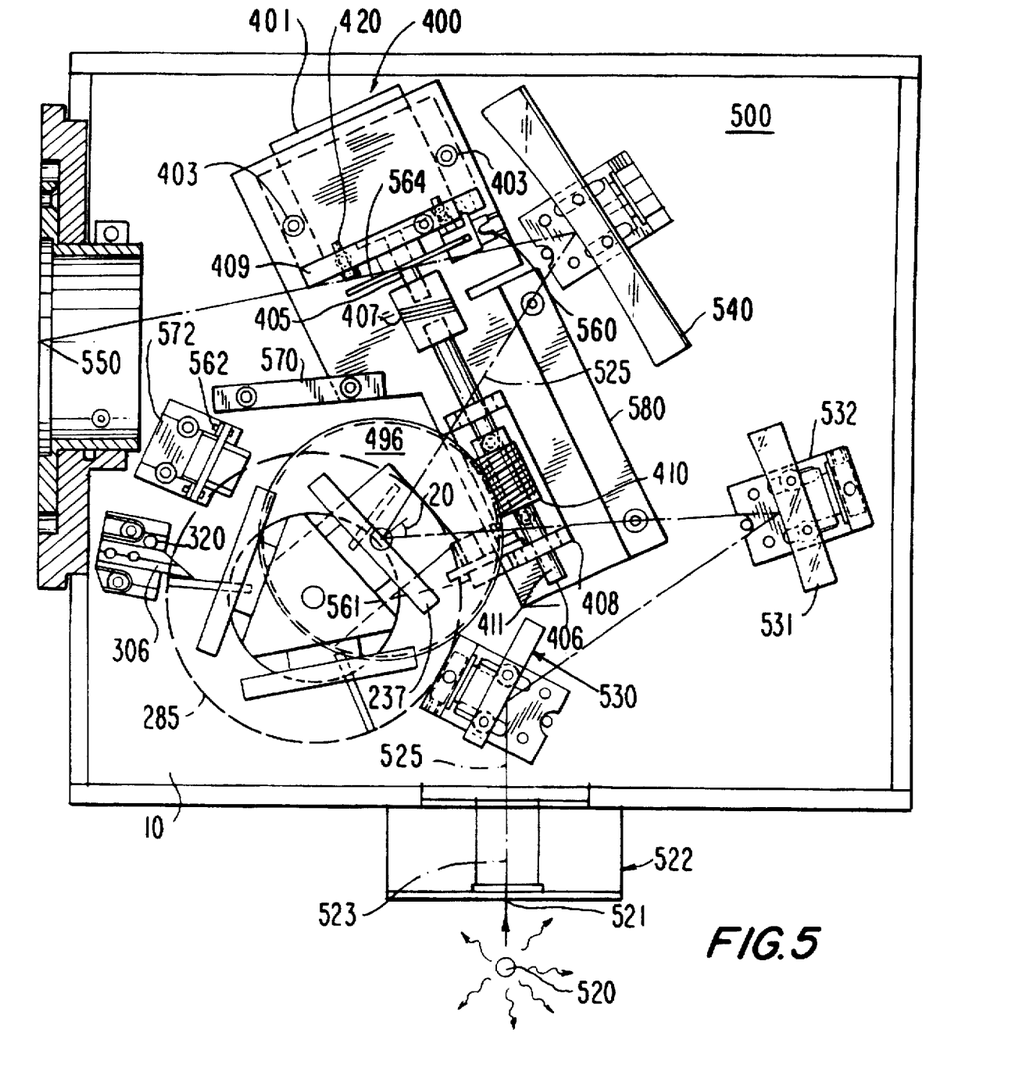
FIG. 5 is a top plan view of a spectrometer which may be used in accordance with the present invention.

As shown clearly in FIGS. 3–5, detent mechanism 220 preferably includes collar 221, plunger ball 222, and spring 223. Collar 221 is preferably a torroid having three evenly spaced snap detent recesses 224–226 on outer surface 227 and is fixedly mounted to grating mount arm 210 by any conventional fastening means, preferably by axial screws (not shown) that are positioned in axial screw holes 228. Alternatively, collar 221 could be mounted to grating mount shaft 211 by one or more radial screws (not shown) as long as the screws do not interfere with the functioning of detent mechanism 220 during rotation of mount block 214. Collar chamber 230 is preferably formed on the underside of grating mount block 214 for receiving collar 221. Plunger chamber 231 preferably extends substantially radially outward in mount block 214 from collar chamber 230, but does not penetrate through outer face 232 of mount block 214. Plunger chamber 231 is loaded with plunger ball 222 and spring 223. Preferably, plunger ball 222 is pressed radially inward by spring 223 toward longitudinal axis 213 so that ball 222 may reciprocate longitudinally along longitudinal axis 233 of plunger chamber 231 in and out of detent recesses 224–226 during rotation of block 214 about axis 213.

Diffraction gratings 237–239 are mounted circumferentially around mount block 214. As most clearly shown by FIG. 1, multi-position mount block 214 is preferably substantially triangular in shape, having three faces to accommodate three gratings. One grating is preferably mounted to each face of multi-position mount block. In particular, gratings 237–239 are preferably mounted to faces 241–243, respectively. While mount block 214 is designed to accommodate three gratings, it should be clear that multi-position mount block 214 may be designed to accommodate any number of gratings, and therefore would preferably have the shape of a higher-order polygon.

Figure 1:
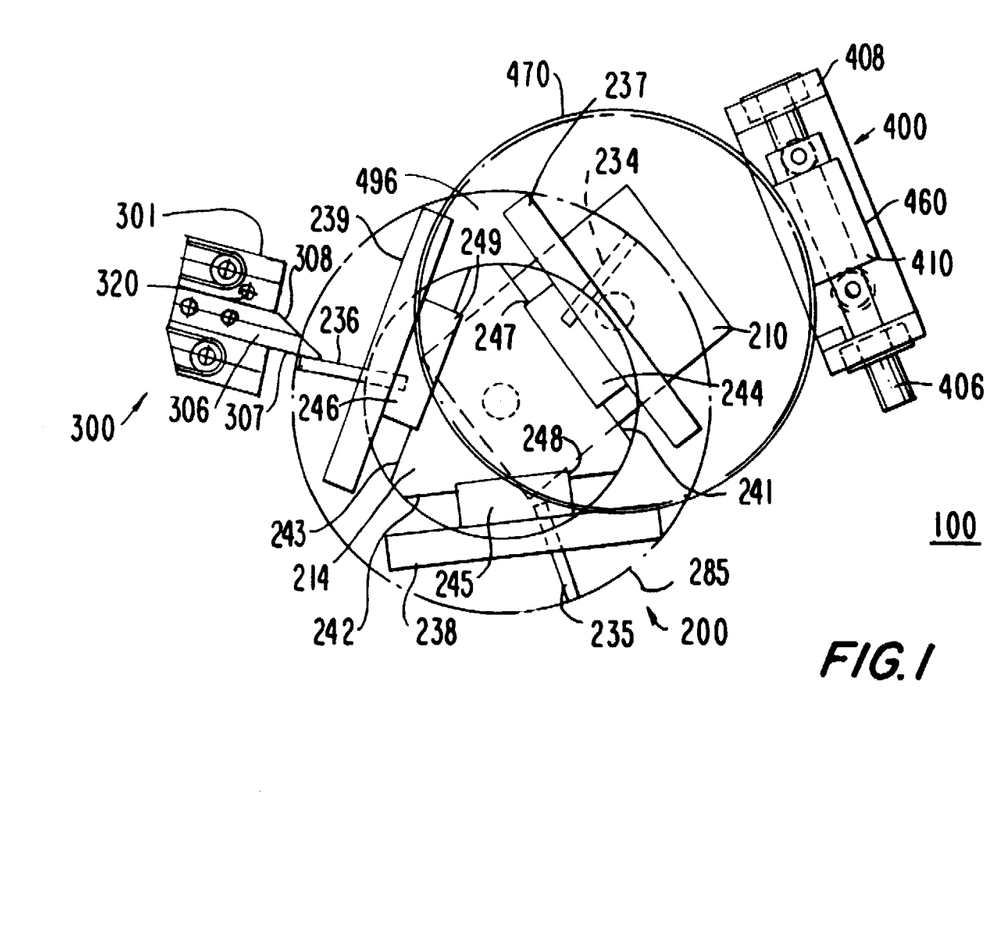
FIG. 1 is a top plan view of a preferred embodiment of a grating drive apparatus in accordance with the present invention.

Preferably, each of gratings 237–239 is mounted to multi-position mount block 214 with an adjustable mounting device. Preferably, the adjustable mounting devices are mount buttons 244–246. Adjustable mount buttons 244–246 should be adjusted at the time that gratings 237–239 are first mounted to them so that the preferred rotational axis of each corresponding grating is precisely parallel with rotational axes 497 and 213. Moreover, each button should be adjusted so that the preferred axis of each grating is coaxial with rotational axis 497 when that grating is rotated into the active position of the spectrometer to become the active grating.

Preferably, grating mount buttons 244–246 are mounted in shallow button recesses 247–249, respectively, by any conventional mounting means, preferably by button mounting screws 251. Preferably, one or more screws 250 are also provided to adjust each respective grating in its respective grating mount button.

Preferably, grating position pins 234–236 are mounted so that they extend substantially radially from mount block 214, although they may be fixedly mounted to any component which is fixed relative to mount block 214. Preferably, grating position pins 234–236 rotate with mount block 214 in a single rotational path 285 about axis 213, so that continued rotation inevitably causes one of pins 234–236 to engage mechanical stop assembly 300.

Mechanical stop assembly 300 is preferably mounted to spectrometer base plate 10, but may be mounted to anything which has a fixed position relative to base plate 10. Assembly 300 engages turret 200, preferably at any of grating position pins 234–236, during rotation of pinion gear 496 about axis 497. Mechanical stop assembly 300 is preferably supported by stop mount block 301, which is preferably mounted to spectrometer base plate 10 by one or more screws 302. Stop mount block 301 is preferably constructed to receive an engagement device for engaging turret 200 during rotation about axis 213. Preferably, the engagement device includes grating stop post 303, spring holder 304, and spring 305. Rotatable stop arm 306, having flat face 307 and angled face 308, is fastened to the upper end of stop post 303 by any conventional means, preferably by spring washer 307 and screw 308. Stop arm 306 is rotatable about axis 310. Mechanical stop assembly 300 also preferably includes grating stop pin 320. Grating stop pin 320 is preferably mounted to stop mount block 301 so that stop arm 306 is prevented from rotating past stop pin 320 when engaged by a grating position pin 234–236 as turret 200 rotates clockwise. When a grating position pin 234–236 forces arm 306 to rotate in the clockwise direction about axis 310 as turret 200 rotates counter-clockwise, arm 306 preferably rotates against the restoring force provided by spring 305.

In addition to turret 200 and mechanical stop assembly 300, grating drive apparatus 100 includes drive assembly 400. Drive assembly 400 may be any convenient means for transferring rotational motion from motor 401 to rotational motion of pinion gear 496. Drive assembly 400 preferably includes support structure 490, which includes housing 491, which is fixedly mounted to spectrometer base plate 10 by any conventional means, preferably by screws 492. Support structure 490 also preferably includes ball bearings 493 and retaining ring 494 which support main shaft 495 so that shaft 495 is rotatably mounted to housing 491. Drive assembly 400 also preferably includes pinion gear 496, which is preferably fastened near the upper end of main shaft 495 for rotation about rotational axis 497.

As shown in FIG. 5, "L-shaped" motor mount 409 is preferably fastened to spectrometer base plate 10 by any conventional fastening means, preferably by screws 403. Motor 401, which has motor mounting shaft 405, is preferably mounted to motor mount 409 by motor mount screws 420. Motor shaft 405 is coupled to worm gear shaft 406 by shaft coupler 407. Worm gear shaft 406 is preferably supported by drive shaft support block 408. Preferably, worm gear 410 is attached to worm gear shaft 406 by any convenient attachment means, such as set screws. Preferably, rotational axis 411 of worm gear 410 is oriented tangentially (FIG. 1) to pinion gear 496 so that teeth 460 of worm gear 410 and teeth 470 of pinion gear 496 matingly engage, causing rotation of pinion gear 496 when worm gear 410 rotates.

As shown in FIG. 5, grating drive apparatus 100 preferably includes a plurality of position detectors 560–562. More preferably, position detectors 560–562 include optical interrupter modules. Optical interrupter module 560 preferably determines the rotational position of motor shaft 405 by sensing light which passes through a pin hole in rotatable interrupter disk 564. Preferably, optical interrupter module 561 is mounted adjacent pinion gear 496 for determining the rotational position of pinon gear 496. Preferably, module 561 reflects light from the lower face of pinion gear 496 and senses the position of pinion gear 496 by monitoring changes in reflectivity. In a similar fashion, optical interrupter module 562 preferably reflects light from mount block 214 to determine which of gratings 237–239 is in the active position of the spectrometer 500. Optical interrupter module 562 is preferably mounted to spectrometer base 10 by module mount 572. In combination, position detectors 560–562 can accurately determine the identity and position of which ever grating is in the active position, and thus can be used to initialize an automated control system to select the grating and the operational wavelength.

As shown in FIG. 5, spectrometer 500 also preferably includes a plurality of baffles, such as baffles 570 and 580, for preventing stray light from contaminating the diffracted light which is being directed through exit port 550, which may be a slit or an optical detector.

In accordance with the present invention, a method is provided for changing an active grating in spectrometer 500 and for selecting an operational wavelength by rotating pinion gear 496 appropriately about axis 213. Stop arm 306 is aligned in rotational path 285 of position pins 234-236. Therefore, if pinion gear 496 is rotated sufficiently, one of grating position pins 234-236 will engage stop arm 306, depending on the relative position of pinion gear 496. FIG. 1 shows grating drive apparatus 100 when grating position pin 236 engages flat face 307 of stop arm 306. Preferably, when pinion gear 496 rotates in a clockwise direction about axis 497, position pin 236 applies a force to stop arm 306. Because stop pin 320 prevents stop arm 306 from rotating about axis 310, stop arm 306 applies a counter-force to position pin 236 which is fixed to mount block 214. Responsive to that counter-force, as pinion gear 496 continues to rotate, mount block 214 rotates in the counter-clockwise direction about axis 213. By forcing mount block 214 to rotate about axis 213, the grating in the active position is changed. The lengths of stop arm 306 and grating position pins 234-236 are selected so that grating position pin 234-236 clears stop arm 306 just as mount block 214 assumes its new desired position.

In accordance with the present invention, a grating is in the "active" position when the preferred axis of that grating is coaxial with rotational axis 497 of pinion gear 496. As shown in FIG. 1, grating 237 is in the active position; however, it is not "operational." For grating 237 to be "operational"—i.e., to be capable of directing a selected diffracted wavelength of light along optical path 525 to exit port 550, grating position pin 236 would have to be on the opposite side of stop arm 306 from the position shown. In the operational position, if a different wavelength is desired, pinion gear 496 may be rotated in either direction about axis 497. Pinion gear 496 may be rotated counter-clockwise after exchanging a grating so that angle of incidence 20 is within the allowed range of angles for that particular grating.

As described above, in order to remove grating 237 from the active position of spectrometer 500 and place grating 238 in the active position, drive assembly 400 drives pinion gear 496 in a clockwise direction. As pinion gear 496 rotates clockwise about rotational axis 497, position pin 236 engages with flat face 307 of stop arm 306. Because grating stop pin 320 preferably prevents stop arm 306 from rotating past it, mount block 214 is forced to rotate in a counter-clockwise direction about axis 213 until grating 238 is in the active position of spectrometer 500.

In order for mount block 214 to begin rotation, however, the force exerted by stop arm 306 against position pin 236 must overcome the force holding plunger ball 222 in one of detent recesses 224-226 of collar 221. Once that force is overcome, pinion gear 496 continues to rotate clockwise and mount block 214 continues to rotate counterclockwise. Mount block 214 rotates until grating position pin 236 is no longer in contact with stop arm 306. At that point, grating 238 will have rotated about axis 213 so that it is fully into the active position of the spectrometer, and grating 237 will have rotated so that it is fully out of that position. When position pin 236 no longer engages stop arm 306, plunger ball 222 is automatically positioned in the next detent position of collar 221, locking mount block 214 firmly in place relative to pinion gear 496.

Immediately after an old grating is replaced by a new grating, the new grating is in the active position of the spectrometer and the spectrometer is preferably fully operational. During operation, mount block 214 remains fixed relative to pinion gear 496. Pinion gear 496 may rotate in a clockwise or counterclockwise direction without changing the active grating as long as none of the grating position pins 234-236 engages flat face 307 of mechanical stop arm 306. Without such engagement, stop arm 306 can not apply the force necessary to overcome the counter-force which holds plunger ball 222 in a detent recess of collar 221. Because the force is not overcome, mount block 214 remains fixed relative to pinion gear 496 and axis 213.

If one of position pins 234-236 engages angled face 308 of stop arm 306 during counter-clockwise rotation of pinion gear 496, mount block 214 remains fixed relative to pinion gear 496 and the grating in the active position remains there. As discussed above, mechanical stop apparatus 300 only forces mount block 214 to rotate about axis 213 when one of grating position pins 234-236 engages flat face 307 of stop arm 306. When pinion gear 496 rotates in the counter-clockwise direction and one of grating position pins 234-236 engages angled face 308 of stop arm 306, mount block 214 does not rotate about axis 213 because stop arm 306 is spring loaded. In other words, when one of grating position pins 234-236 engages and applies a force to angled face 308 of stop arm 306, pinion gear 496 rotates in the counter-clockwise direction about axis 497 and stop arm 306 rotates in a clockwise direction about axis 310. The force required to rotate stop arm 306 is selected to be less than the detent force holding mount block 214.

If pinion gear 496 is rotated sufficiently in the counter-clockwise direction, the grating position pin in contact with stop arm 306 will slide past stop arm 306. When that position pin slides past stop arm 306, stop arm 306 returns under spring bias to its original position against stop pin 320, as shown in FIG. 1. When the position pin in contact with stop arm 306 slides past stop arm 306 during counter-clockwise rotation of pinion gear 496, stop arm 306 does not apply a sufficient counter-force to that position pin to overcome the force which holds plunger ball 222 in a detent recess of collar 221. Therefore, the grating in the active position of the spectrometer is not changed during counter-clockwise rotation of the pinion gear and the spectrometer remains operational until angle of incidence 20 exceeds the allowed range for that particular grating.

To initiate a grating exchange, pinion gear 496 may be rotated in the counter-clockwise direction until one of grating position pins 234-236 slides past stop arm 306. Then, pinion gear 496 should be rotated in the clockwise direction so that that one of grating position pins 234-236 engages flat face 307 of stop arm 306, and the clockwise rotation is continued until mount block 214 advances. Alternatively, pinion gear 496 can simply be rotated in the clockwise direction until one of grating position pins 234-236 engages flat face 307 of stop arm 306 and mount block 214 advances.

Once a particular grating is selected, pinion gear 496 is rotated in the first direction to return the selected grating to the optical path. Pinion gear 496 may then be rotated in either direction to rotate the selected grating about its axis and select an operational wavelength.

In accordance with the principles of the present invention, FIG. 5 shows grating drive apparatus 100 employed in spectrometer 500. Spectrometer 500 is preferably a Czerny-Turner type spectrometer. It should be clear, however, that spectrometer 500 need not be of the Czerny-Turner type and may be any one of a number of types including, for example, a Fastie-Ebert type. In operation, a light source 520 is focused at the entrance slit 521 of slit mount housing 522 and along entrance slit axis 523. The light enters entrance slit 521 and follows optical path 525 in spectrometer 500. The light which enters spectrometer 500 reflects from flat mirror 530 to preferably toroidal mirror 531, which is preferably fixedly mounted to base plate 10 of spectrometer 500 by mirror mount 532. Toroidal mirror 531 further reflects the light to grating 237, which is in the active position and mounted to mount block 214 of grating drive apparatus 100. Grating 237 is operationally positioned by rotation of pinion gear 496 so that a predetermined portion of the diffracted light is directed toward spherical concave mirror 540. Finally, concave mirror 540 reflects the predetermined portion of the diffracted light toward outlet port 550.

While the principles of the present invention have been illustrated in the context of an embodiment which changes gratings by rotation of pinion gear 496 in the clockwise direction, it will be appreciated that the present invention could be designed to operate so that the changing of a grating could be accomplished by rotation of pinion gear 496 in the counter-clockwise direction. For example, if stop pin 320 is mounted on the other side of stop arm 306, stop arm 306 would be prevented from rotating in the opposite direction as shown in FIGS. 1, 2, and 5. Moreover, although stop arm 306 has angled face 306 for facilitating the sliding by of a position pin and flat face 307 for firmly engaging with a position pin during grating exchange, the shape of stop arm 306 could be any one that performs these functions.

Also, while the embodiment shown is mounted horizontally, the apparatus could be operated in any orientation, including upside down. Other variations may also be apparent.

Thus, an apparatus for driving diffraction gratings is provided. One skilled in the art will appreciate that the present invention can be practiced by other than the described embodiments, which are presented for purposes of illustration and not of limitation, and the present invention is limited only by the claims which follow.

What is claimed is:

1. A grating drive apparatus for use in a multiple-grating spectrometer, said spectrometer having an entrance slit, an exit port, an optical path between said entrance slit and said exit port, and a plurality of diffraction gratings, each of said diffraction gratings having a preferred axis and being rotatable about said preferred axis for selecting an operational wavelength, said apparatus comprising:

a turret for mounting said plurality of diffraction gratings, said turret having:
 a turret rotational axis,
 a plurality of grating mount positions corresponding to said plurality of gratings, and
 a plurality of stop engaging surfaces corresponding to said plurality of grating mount positions, said plurality of stop engaging surfaces being aligned in a single rotational path, wherein:
 said turret is rotatable among a plurality of turret rotational positions, and
 in each of said turret rotational positions, one of said grating mount positions is located such that a grating in said one of said grating mount positions is an active grating in an active position in said optical path for rotation about said preferred axis;

a mechanical stop assembly aligned in said single rotational path; and a drive assembly for driving said turret about said preferred axis of said active grating for (a) selecting said operational wavelength when said stop engaging surfaces are out of engagement with said mechanical stop assembly, and (b) advancing said turret from one of said turret rotational positions to another of said turret rotational positions when said mechanical stop assembly engages one of said stop engaging surfaces.

2. The grating drive apparatus of claim 1, wherein said drive assembly comprises:
a turntable rotatable about a turntable axis; and
a motor for rotating said turntable about said turntable rotational axis; wherein:
 said turret is rotationally mounted on said turntable for rotation about said turret rotational axis; and
 when said turret is in one of said turret rotational positions, said preferred axis of said active grating coincides with said turntable rotational axis; wherein:
 rotation of said turntable by said motor rotates said active grating about said preferred axis when said stop-engaging surfaces are out of engagement with said mechanical stop assembly.

3. The grating drive apparatus of claim 2, wherein:
said turntable comprises a pinion gear;
said turret is eccentrically mounted on said pinion gear; and
said motor comprises a shaft having a drive gear thereon for engaging said pinion gear.

4. The grating drive apparatus of claim 3, wherein said drive gear is a worm gear.

5. The grating drive apparatus of claim 3, wherein said turret assembly comprises a detent mechanism having a plurality of detent positions corresponding to said plurality of grating mount positions for releasably locking said turret to said pinion gear in any of said turret rotational positions.

6. The grating drive apparatus of claim 1, wherein said turret has a number of faces equal to said number of turret rotational positions, each of said gratings being mounted to one of said faces.

7. The grating drive apparatus of claim 6, further comprising a number of grating mount buttons for mounting said plurality of gratings, said number of buttons being equal to said number of faces, each of said buttons being adjustable so that said preferred axis of each associated grating is coaxial with said first rotational axis when said associated grating is in said active grating position.

8. The grating drive apparatus of claim 6, wherein said number of faces is three.

9. The grating drive apparatus of claim 1, wherein said stop engaging surfaces comprise surfaces of a plurality of grating position pins corresponding to said plurality of turret rotational positions and extending substantially radially outward from said turret rotational axis for engaging said mechanical stop assembly.

10. The grating drive apparatus of claim 1, wherein said mechanical stop assembly comprises:
a stop mount block fixedly mounted in said spectrometer and having a stop post thereon;
a spring-loaded stop arm rotatably mounted on said stop post for rotation about a stop axis which is parallel to said turret rotational axis, said stop arm extending substantially radially from said stop axis; and
a stop pin fixedly mounted to said stop mount block for preventing said stop arm from rotating about said stop axis when said turret rotates about said turret axis in a direction.

11. The grating drive apparatus of claim 1, further comprising a plurality of position detectors.

12. The grating drive apparatus of claim 11, wherein at least one of said plurality of position detectors comprises an optical interrupter module.

13. The grating drive apparatus of claim 11, wherein said drive assembly comprises:
   a turntable comprising a pinion gear rotatable about a turntable axis; and
   a motor for rotating said turntable about said turntable rotational axis, said motor having a shaft; wherein:
      said turret is mounted on said turntable for rotation about said turret rotational axis.

14. The grating drive apparatus of claim 13, wherein at least one of said position detectors determines a position of said motor shaft.

15. The grating drive apparatus of claim 13, wherein at least one of said position detectors determines a position of said turntable.

16. The grating drive apparatus of claim 13, wherein at least one of said position detectors determines which of said gratings is in said active position.

17. A grating drive apparatus for use in a multiple-grating spectrometer, said spectrometer having an entrance slit, an exit port, an optical path between said entrance slit and said exit port, and a plurality of diffraction gratings, said apparatus comprising:
   a turret for mounting said plurality of gratings, said turret having:
      a turret rotational axis,
      a plurality of grating mount positions corresponding to said plurality of gratings, and
      a plurality of stop engaging surfaces corresponding to said plurality of grating mount positions, said plurality of stop engaging surfaces being aligned in a single rotational path, wherein:
         said turret is rotatable among a plurality of turret rotational positions, and
         in each of said turret rotational positions one of said grating mount positions is located such that a grating in said one of said grating mount positions is an active grating in an active position in said optical path;
   a mechanical stop assembly aligned in said single rotational path; and
   a drive assembly for rotating said turret to bring one of said stop engaging surfaces into engagement with said mechanical stop assembly for advancing said turret from one of said turret rotational positions to another of said turret rotational positions to move one of said gratings out of said active position and to introduce another of said gratings into said active position.

18. A method of operating a grating drive apparatus for use in a multiple-grating spectrometer, said spectrometer having an entrance slit, an exit port, an optical path between said entrance slit and said exit port, and a plurality of diffraction gratings, each of said diffraction gratings having a preferred axis and being rotatable about said preferred axis for selecting an operational wavelength, said apparatus comprising:
   a turret for mounting said plurality of diffraction gratings, said turret having:
      a turret rotational axis,
      a plurality of grating mount positions corresponding to said plurality of gratings, and
      a plurality of stop engaging surfaces corresponding to said plurality of grating mount positions, said plurality of stop engaging surfaces being aligned in a single rotational path, wherein:
         said turret is rotatable among a plurality of turret rotational positions, and
         in each of said turret rotational positions, one of said grating mount positions is located such that a grating in said one of said grating mount positions is an active grating in an active position in said optical path for rotation about said preferred axis,
   a mechanical stop assembly aligned in said single rotational path, and
   a drive assembly for driving said turret about said preferred axis of said active grating, said method comprising the steps of:
      selecting said operational wavelength by using said drive assembly to rotate said turret with said stop engaging surfaces out of engagement with said mechanical stop assembly; and
      advancing said turret from one of said turret rotational provisions to another of said turret rotational provisions, by using said drive assembly to rotate said turret with said mechanical stop assembly engaging one of said stop engaging surfaces.

* * * * *